(12) United States Patent
Edvardsson

(10) Patent No.: US 8,915,133 B2
(45) Date of Patent: Dec. 23, 2014

(54) ARRANGEMENT AND METHOD FOR TESTING A LEVEL GAUGE SYSTEM

(71) Applicant: Rosemount Tank Radar AB, Gothenburg (SE)

(72) Inventor: Olov Edvardsson, Linkoping (SE)

(73) Assignee: Rosemount Tank Radar AB, Gothenburg (SE)

( * ) Notice: Subject to any disclaimer, the term of this patent is extended or adjusted under 35 U.S.C. 154(b) by 309 days.

(21) Appl. No.: 13/625,241

(22) Filed: Sep. 24, 2012

(65) Prior Publication Data

US 2014/0083183 A1    Mar. 27, 2014

(51) Int. Cl.
*G01F 23/284* (2006.01)

(52) U.S. Cl.
USPC .......................................................... 73/293

(58) Field of Classification Search
CPC ................................................... G01F 23/292
USPC ............................................................ 73/293
See application file for complete search history.

(56) References Cited

U.S. PATENT DOCUMENTS

| | | | | |
|---|---|---|---|---|
| 5,257,090 | A * | 10/1993 | Meinzer et al. | 356/498 |
| 5,262,786 | A | 11/1993 | Cross | 342/167 |
| 8,823,397 | B2 * | 9/2014 | Edvardsson | 324/664 |
| 2001/0000851 | A1 | 5/2001 | Morimoto | |
| 2009/0076744 | A1 * | 3/2009 | Anderson | 702/55 |
| 2010/0156702 | A1 * | 6/2010 | Edvardsson | 342/124 |
| 2012/0299768 | A1 * | 11/2012 | Griessbaum et al. | 342/124 |
| 2012/0319891 | A1 * | 12/2012 | Edvardsson et al. | 342/124 |
| 2013/0076559 | A1 * | 3/2013 | Edvardsson | 342/124 |
| 2014/0085130 | A1 * | 3/2014 | Edvardsson | 342/124 |

FOREIGN PATENT DOCUMENTS

| | | |
|---|---|---|
| EP | 1191315 A2 | 3/2002 |
| SE | 9803377 A | 3/2000 |

OTHER PUBLICATIONS

Notification of Transmittal of the International Search Report and the Written Opinion of the International Searching Authority, or the Declaration dated Feb. 19, 2014 in related International Application No. PCT/SE2013/000132, filed Aug. 23, 2013. 9 pgs.
Operating Instructions, Levelflex M FMP43, Guided Level Radar, Calibration Kit, *Endress+Hauser*, pp. 1-16, (Jul. 2008).

* cited by examiner

*Primary Examiner* — G. Bradley Bennett
(74) *Attorney, Agent, or Firm* — Westman, Champlin & Koehler, P.A.

(57) ABSTRACT

The invention relates to a test arrangement comprising a waveguide, a first signal reflecting device and a second signal reflecting device. The first signal reflecting device is configured to reflect an electromagnetic signal traveling along the waveguide from the second signal reflecting device back towards the second reflecting device and to allow, at least during a time period, an electromagnetic signal traveling along the waveguide from the second signal reflecting device towards the first signal reflecting device to pass the first signal reflecting device. Hereby, a selected number of passages through a waveguide can be used to simulate passage through a much longer waveguide, and that this allows for use of a high-quality waveguide which would otherwise be too bulky, too heavy or too expensive to use depending on field of application.

15 Claims, 5 Drawing Sheets

ARRANGEMENT AND METHOD FOR TESTING A LEVEL GAUGE SYSTEM

FIELD OF THE INVENTION

The present invention relates to a test arrangement for a level gauge system and to a method of testing a level gauge system.

TECHNICAL BACKGROUND

Radar level gauge (RLG) systems are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a waveguide. The probe is generally arranged to extend vertically from the top towards the bottom of the tank. The probe may also be arranged in a measurement tube, a so-called chamber, that is connected to the outer wall of the tank and is in fluid connection with the inside of the tank.

The transmitted electromagnetic signals are reflected at the surface of the product, and the reflected signals are received by a receiver or transceiver comprised in the radar level gauge system. Based on the transmitted and reflected signals, the distance to the surface of the product can be determined.

More particularly, the distance to the surface of the product is generally determined based on the time between transmission of an electromagnetic signal and reception of the reflection thereof in the interface between the atmosphere in the tank and the product contained therein. In order to determine the actual filling level of the product, the distance from a reference position to the surface is determined based on the above-mentioned time (the so-called time-of-flight) and the propagation velocity of the electromagnetic signals.

Most radar level gauge systems on the market today are either so-called pulsed radar level gauge systems that determine the distance to the surface of the product contained in the tank based on the difference in time between transmission of a pulse and reception of its reflection at the surface of the product, or systems that determine the distance to the surface based on the frequency difference between a transmitted frequency-modulated signal and its reflection at the surface. The latter type of systems are generally referred to as being of the FMCW (Frequency Modulated Continuous Wave) type.

It may be beneficial and, in some cases, even required by law to regularly test the radar level gauge system to verify the measurement accuracy of the radar level gauge system or to calibrate the radar level gauge system.

Testing could be performed by temporarily removing the radar level gauge system, manually measuring the distance to the surface of the product in the tank, and then comparing the thus obtained distance with that provided by the radar level gauge system.

This is, however, often not desirable for various reasons. For example, the tank may be pressurized and/or the product may be dangerous or sensitive. Furthermore, such testing may be time-consuming, cumbersome and not sufficiently accurate.

When the measurement unit of the radar level gauge system can be detached from the signal propagating device (arranged inside the tank) without breaking the process connection, a waveguide of a known length can be used to test the radar level gauge system for the particular distance corresponding to the length of the waveguide. For some applications it would, however, be desirable to test the performance of the waveguide for the current measurement distance in that particular tank, or across the entire measurement range of the radar level gauge system.

One solution aimed at achieving this is the Levelflex M FMP43 Calibration kit sold by Endress+Hauser (http://www.endress.com). This calibration kit contains a number of coaxial cables of different lengths that can be connected to provide several reference distances up to a maximum distance of 1860 mm.

It would, however, be desirable to be able to test the performance of a radar level gauge system for a larger number of measurement distances as well as for a significantly larger maximum distance.

SUMMARY

In view of the above, a general object of the present invention is to provide an improved test arrangement for a level gauge system.

According to a first aspect of the present invention, it is therefore provided a test arrangement for a level gauge system comprising a measurement unit and a signal propagation device connected to the measurement unit, the test arrangement comprising: a waveguide being connectable to the level gauge system at a connection to allow an electromagnetic transmit signal transmitted by the measurement unit to be propagated by the waveguide; a first signal reflecting device arranged along the waveguide, at a first distance along the waveguide from the connection, the first signal reflecting device being configured to allow at least a portion of the electromagnetic transmit signal from the measurement unit to pass the first signal reflecting device and continue further along the waveguide; and a second signal reflecting device arranged along the waveguide, at a second distance along the waveguide from the connection being greater than the first distance, for reflecting an electromagnetic signal traveling along the waveguide from the first signal reflecting device back towards the first signal reflecting device, wherein the first signal reflecting device is configured to reflect an electromagnetic signal traveling along the waveguide from the second signal reflecting device back towards the second reflecting device and to allow, at least during a time period occurring at a predetermined time after transmission of the electromagnetic transmit signal from the measurement unit, an electromagnetic signal traveling along the waveguide from the second signal reflecting device towards the first signal reflecting device to pass the first signal reflecting device to allow the electromagnetic signal to be received by the measurement unit of the level gauge system.

In the context of the present application, "waveguide" should be understood as a structure capable of guiding an electromagnetic signal, in particular a microwave signal. The waveguide may thus, for example, be any one of a coaxial cable, a microstrip line, a hollow waveguide, a surface waveguide etc.

The "connection" at which the waveguide is connectable to the level gauge system may be a connector directly connecting the measurement unit and the waveguide. For a level gauge system comprising a transmission line probe, such as a so-called guided wave radar (GWR) level gauge system, the measurement unit may, for example, be disconnected from the transmission line probe and a connector comprised in the test arrangement may be connected to the measurement unit instead of the transmission line probe.

However, the waveguide may alternatively be connected to the level gauge system via at least a portion of the signal propagation device. For instance, in the case of a free radiating type level gauge system in which the signal propagating device is a radiating antenna, such as a horn antenna, the "connection" may be between the radiating antenna of the level gauge system and a receiver comprised in the test arrangement for receiving the electromagnetic transmit signal radiated by the antenna so that the electromagnetic transmit signal can be propagated by the waveguide of the test arrangement.

A "portion" of an electromagnetic signal should be understood to mean a portion of the electromagnetic signal in terms of time and/or "signal strength" (power, amplitude or energy).

The present invention is based on the realization that a selected number of passages through a waveguide can be used to simulate passage through a much longer waveguide, and that this allows for use of a high-quality waveguide which would otherwise be too bulky, too heavy or too expensive to use depending on field of application.

Hereby, a relatively compact and cost-efficient test arrangement can be achieved, which provides for high quality testing of a level gauge system, in particular for a long measurement distance and/or many different measurement distances.

According to various embodiments of the test arrangement of the present invention, the first signal reflecting device may comprise an impedance transition.

The impedance transition, which may be a passive structure without controllable electronic components, may be configured to reflect a first portion of a power of an electromagnetic signal incident on the impedance transition and to allow passage of a second portion of the power of the electromagnetic signal.

An electromagnetic signal that is traveling along the waveguide of the test arrangement from the first reflecting device towards the second reflecting device will be reflected at the second reflecting device. The reflected electromagnetic signal will travel along the waveguide back towards the first reflecting device. When this electromagnetic signal reaches the first reflecting device, a first portion of the electromagnetic signal will be reflected back towards the second reflecting device, and a second portion of the electromagnetic signal will pass the first reflecting device and be allowed to continue towards the measurement unit of the level gauge system. In this way, a series of electromagnetic signals with decreasing power levels will be allowed to pass the first reflecting device and travel towards the measurement unit. Based on the power and/or timing of the electromagnetic signals, the measurement unit can determine which electromagnetic signal(s) should be used for the ongoing test.

In these embodiments, the impedance transition of the first signal reflecting device may advantageously be configured to reflect a substantial portion of an incident electromagnetic signal so that several signal passages between the first signal reflecting device and the second signal reflecting device can be achieved before the signal traveling back and forth between the first and second signal reflecting devices is too weak.

For example, the impedance transition may be configured to reflect at least 20 percent of the power of the incident electromagnetic signal. Advantageously, the impedance transition may be configured to reflect at least 40 percent, at least 60 percent or even at least 80 percent of the power of the incident electromagnetic signal. An optimum range may be 40 percent to 80 percent. Accordingly, the impedance transition should be a "heavy mismatch", which is not achieved, for instance, by an ordinary connection between two coaxial cables. Commercial specifications for cable connectors typically limit the power reflection to 1-4% depending on type and quality.

The impedance transition may be realized in different ways depending on the configuration of the waveguide of the test arrangement. For a hollow waveguide, a thin dielectric disk in the waveguide may provide the desired heavy mismatch, and for a coaxial cable, a thin metal wire may be arranged to short circuit the inner conductor and the shield. Various other ways of providing a heavy mismatch to a waveguide are easily achievable by one of ordinary skill in the art. For example, in embodiments where the waveguide is a coaxial cable, an impedance transition (in the form of an impedance discontinuity) can be realized using a shorted T-crossing or a small gap in the center conductor. These are two exemplary ways of achieving a strong reflection with some leakage. In the case of a hollow waveguide, the desired strong reflection can be achieved by placing a flat dielectric sheet across the waveguide. For example a quarter wavelength thick sheet of ceramic material ($\in r \approx 10$) will reflect 67% of the incident power.

The reflection at the second reflecting device may advantageously be close to 100%, and may be a short-circuit or an open line.

According to various embodiments of the test arrangement, the first signal reflecting device may comprise switching circuitry controllable between a signal conducting state and a signal reflecting state.

In these embodiments, the first signal reflecting device can be controlled to first allow a signal to enter the portion of the waveguide between the first signal reflecting device and the second signal reflecting device, and then the first signal reflecting device can be controlled to "keep" the signal traveling back and forth between the first and second signal reflecting devices until a given time has passed. After that, the first signal reflecting device can be controlled to allow the signal to pass the first signal reflecting device and travel back to the measurement unit.

To that end, the test arrangement may advantageously further comprise timing control circuitry connected to the switching circuitry and to the waveguide between the connection and the switching circuitry, the timing control circuitry being configured to sense the electromagnetic transmit signal transmitted by the measurement unit and to control a switching state of the switching circuitry based on a timing of the electromagnetic transmit signal.

Based on the timing of the electromagnetic transmit signal and the known propagation time along the waveguide of the test arrangement between the first signal reflecting device and the second signal reflecting device and back, the timing control circuitry may control the switching circuitry to achieve the desired "bouncing" back and forth of the electromagnetic transmit signal between the first signal reflecting device and the second signal reflecting device.

To reduce the amplitude of transient pulses resulting from switching state transitions of the switching circuitry, the switching circuitry should advantageously not be too fast. It is expected that a switching time substantially longer than one nanosecond should be desirable to sufficiently reduce the risk of pulses resulting from switching of the switching circuitry being mistaken for echo pulses.

While being substantially longer than one nanosecond, the switching time should also be shorter than a propagation time of an electromagnetic signal along the waveguide from the switching circuitry to the second signal reflecting device and back to the switching circuitry.

In practical applications, it may be advantageous to configure and/or control the switching circuitry to have a switching time from the signal conducting state to the signal reflecting state that is between 2 ns and 20 ns, such as between 5 ns and 15 ns or between 10 ns and 15 ns.

The switching circuitry may, for example, comprise a simple on-off switch (a so-called SPST—single pole, single throw). To reduce signal leakage through the switching circuitry, the switching circuitry may, however, advantageously comprise a double switch.

According to various embodiments, the second signal reflecting device may advantageously be arranged at the end of the waveguide. In many situations, the end of the waveguide will itself provide sufficient reflection, but depending on waveguide type or configuration, a suitable termination may be desirable. A short circuit or an open end are two possibilities.

Furthermore, the test arrangement according to various embodiments of the present invention may advantageously be comprised in a level gauge system, further comprising a measurement unit; and a signal propagation device connected to the measurement unit for propagating an electromagnetic transmit signal from the measurement unit towards a surface of the product, and to return an electromagnetic reflection signal resulting from reflection of the electromagnetic transmit signal at the surface back to the measurement unit, wherein the level gauge system is controllable between: a filling level determination state in which the measurement unit determines the filling level based on the electromagnetic reflection signal; and a test state in which the waveguide of the test arrangement is connected to the measurement unit in such a way that the electromagnetic transmit signal transmitted by the measurement unit is propagated by the waveguide.

Since the test arrangement according to various embodiments of the present invention provides for a compact and cost-efficient solution, it may be beneficial to include the test arrangement in the level gauge system, and to configure the level gauge system such that it is switchable between a state in which the electromagnetic signal from the measurement unit is routed to the propagation device, such as a probe or radiating antenna, and another state in which the electromagnetic signal from the measurement unit is routed to the waveguide of the test arrangement.

In order to facilitate interpretation of the signal returned by the test arrangement, the level gauge system may, in its test state, be configured to determine a test result based on an electromagnetic signal received from the test arrangement only during a time period corresponding to the particular distance for which the level gauge system should be tested. This may be particularly useful for embodiments of the test arrangement in which the first signal reflecting device comprises an impedance transition that transmits a portion of each electromagnetic signal incident on the impedance transition.

To allow for adjustment of the test result for temperature dependent effects, the test arrangement and/or the level gauge system may comprise a temperature sensor. The temperature sensor may be any sensor useable to sense the temperature of the test arrangement and/or at least a part of the measurement unit of the level gauge system. The signal provided by the temperature sensor may, for example, be an electrical signal, such as a temperature dependent current or voltage.

According to a second aspect of the present invention, it is provided a method of testing a level gauge system comprising a measurement unit and a signal propagation device connected to the measurement unit, using a test arrangement comprising a waveguide, a first signal reflecting device arranged along the waveguide and a second signal reflecting device arranged along the waveguide spaced apart from the first signal reflection device, the method comprising the steps of: transmitting an electromagnetic transmit signal from the measurement unit; propagating the electromagnetic transmit signal along the waveguide from a connection at which the waveguide is connected to the measurement unit past the first signal reflecting device to the second signal reflecting device, where the electromagnetic transmit signal is reflected back along the waveguide towards the first signal reflecting device and then back and forth between the first reflecting device and the second reflecting device; receiving, at the measurement unit, an electromagnetic reflection signal resulting from the electromagnetic transmit signal having traveled back and forth between the first signal reflecting device and the second signal reflecting device a preselected number of times; and determining a distance corresponding to a time between transmission of the electromagnetic transmit signal and reception of the electromagnetic reflection signal.

According to various embodiments, the method according to the present invention may further comprise the steps of detaching the measurement unit from the signal propagation device; and connecting the waveguide of the test arrangement to the measurement unit.

According to various embodiments, the method may further comprise the steps of controlling switching circuitry comprised in the first reflecting device from a signal conducting state to a signal reflecting state after the electromagnetic transmit signal transmitted by the measurement unit has passed the switching circuitry; and controlling the switching circuitry from the signal reflecting state to the signal conducting state after the electromagnetic transmit signal has traveled back and forth between the first signal reflecting device and the second signal reflecting device the preselected number of times.

Further effects and features of this second aspect of the present invention are largely analogous to those described above in connection with the first aspect of the invention.

BRIEF DESCRIPTION OF THE DRAWINGS

These and other aspects of the present invention will now be described in more detail, with reference to the appended drawings showing an exemplary embodiment of the invention, wherein.

DETAILED DESCRIPTION OF EXAMPLE EMBODIMENTS

In the present detailed description, various embodiments of the test arrangement according to the present invention are mainly discussed with reference to testing of a pulsed radar level gauge system of the GWR (guided wave radar) type.

It should be noted that this by no means limits the scope of the present invention, which also covers test arrangements for testing of other types of level gauge systems, such as level gauge systems that are not pulsed, but emit a substantially continuous signal, such as so-called FMCW (frequency modulated continuous wave) systems. Furthermore, the test arrangement according to various embodiments of the present invention may equally well be used for testing of free radiating radar level gauge systems.

Figure 1:
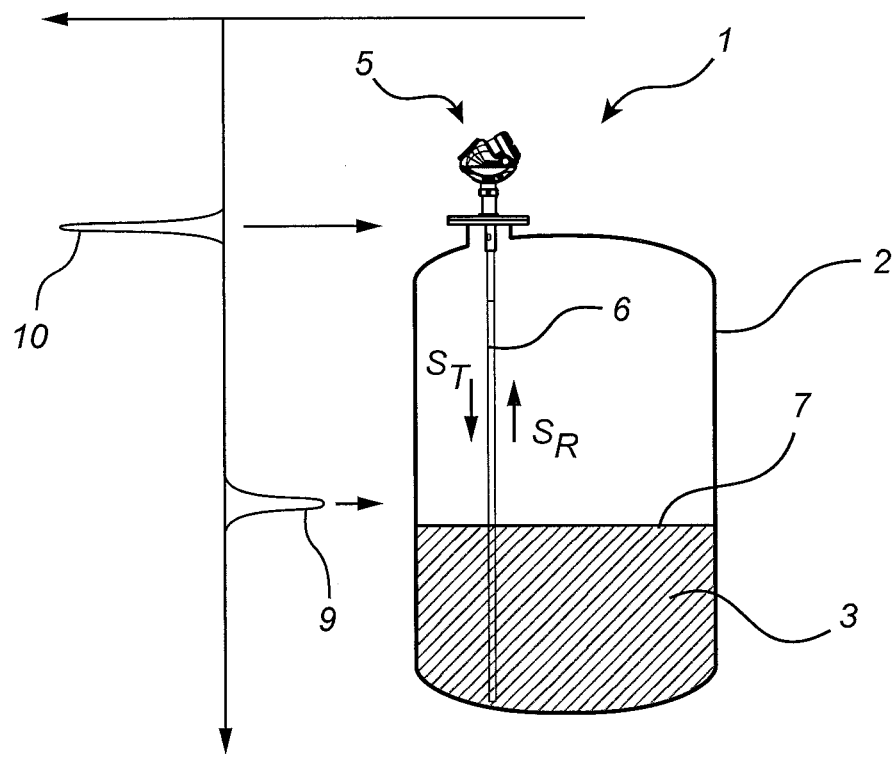
FIG. 1 schematically illustrates an exemplary level gauge system comprising a measurement unit and a propagation device in the form of a transmission line probe.

FIG. 1 schematically illustrates a level gauge system 1 arranged on top of a tank 2 for determining the filling level of a product 3 contained in the tank 2 using microwaves. The level gauge system 1 is therefore in the following referred to as a radar level gauge system or an RLG-system.

The radar level gauge system 1 comprises a measurement unit 5, a propagation device, here in the form of a transmission line probe 6 for propagating microwaves towards a surface 7 of the product 3 contained in the tank 2.

When measuring the filling level of the product 3 contained in the tank 2, the radar level gauge system 1 transmits an electromagnetic transmission signal $S_T$ by the probe 6 towards the surface 7 of the product 3, where the signal is reflected as a surface echo signal $S_R$. The distance between a reference position at the top of the tank 2 and the surface 7 of the product 3 is then determined based on the difference in time-of-flight of the surface echo signal $S_R$ (from the radar level gauge system 1 to the surface 7 and back) and an echo signal reflected from the reference position at the top of the tank. In FIG. 1, the surface echo is represented by a negative echo 9 and the reference echo is represented by a positive echo 10. From the distance (time) between the surface echo and the reference echo, and known dimensions of the tank 2, the filling level can be deduced.

It should be noted that, although a tank 2 containing a single product 3 is discussed herein, the distance to any material interface present in the tank 2 can be measured in a similar manner given that the electromagnetic signals transmitted by the measurement unit are not attenuated so much that no useful reflection signal can be obtained.

Figure 2:
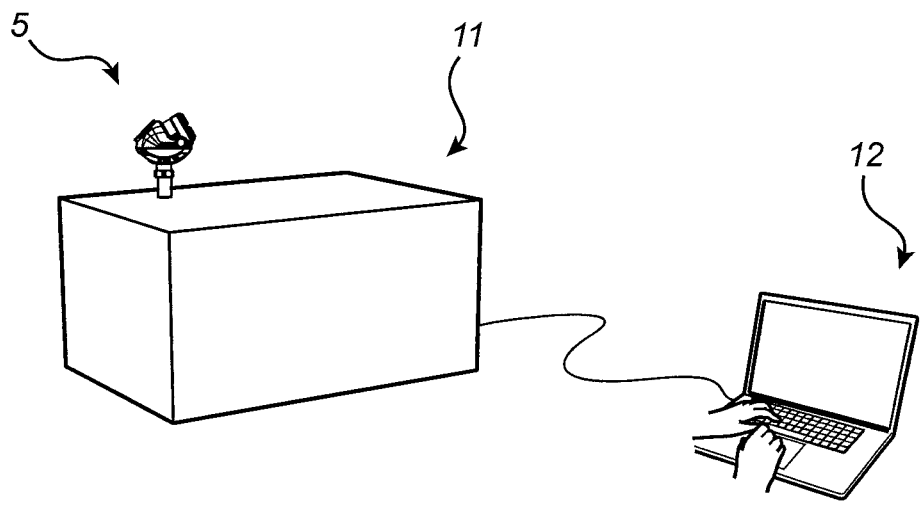
FIG. 2 schematically illustrates the measurement unit of the level gauge system in FIG. 1 attached to a test arrangement according to an embodiment of the present invention.

For level gauge systems 1 such as that described above with reference to FIG. 1, it may be desirable to test and/or verify the measurement accuracy from time to time. To avoid breaking the so-called process seal, the measurement unit 5 of the level gauge system 1 may be disconnected from the transmission line probe 6 and connected to a test arrangement. This is schematically illustrated in FIG. 2, which shows the measurement unit 5 connected to a box 11 housing the test arrangement. FIG. 2 also shows a computer 12 connected to the measurement unit 5 via the box 11. Depending on the configuration of the test arrangement, the computer may also be connected to the test arrangement for controlling operation of the test arrangement.

Figure 3:
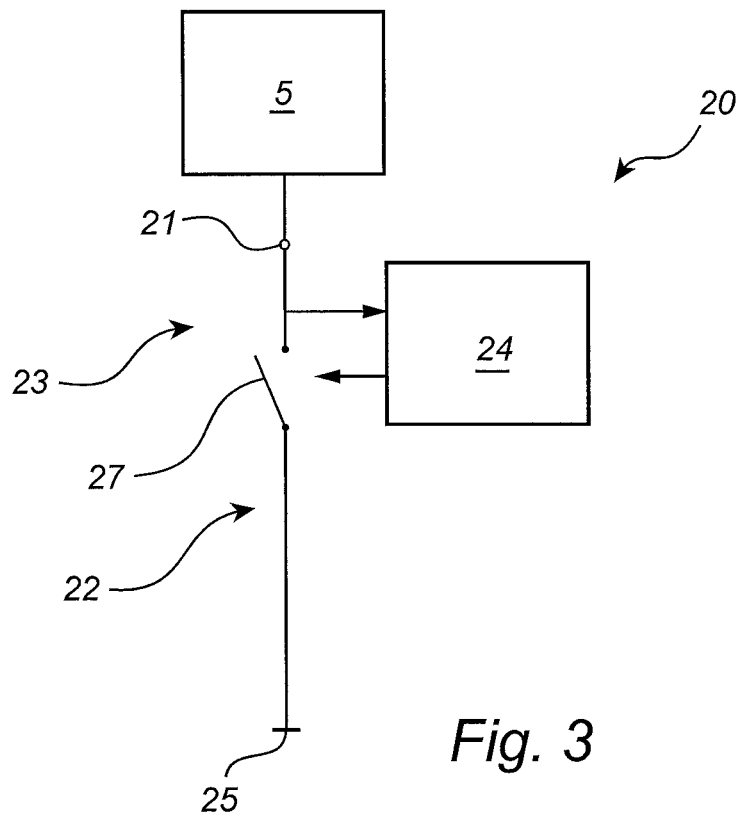
FIG. 3 is a schematic block diagram of a first embodiment of the test arrangement in FIG. 2.

A first embodiment of the test arrangement according to the present invention will now be described with reference to the schematic block diagram of FIG. 3 showing the measurement unit 5 connected to the test arrangement 20 at a connection 21. Referring to FIG. 3, the test arrangement 20 comprises a waveguide 22, a first signal reflecting device 23, timing control circuitry 24 and a second signal reflecting device 25. The first signal reflecting device 23 comprises switching circuitry, here illustrated as a single switch 27, and the timing control circuitry 24 is connected to the waveguide 22 between the connection 21 and the switch 27 and to the switch 27, in order to control the state of the switch 27 based on a timing of an electromagnetic signal, such as a pulse, on the waveguide 22 between the connection 21 and the switch 27.

The waveguide 22 may advantageously comprise a coaxial cable with a relatively low attenuation, and the second signal reflecting device may be arranged at the end of the coaxial cable, possibly comprising a suitable termination for the coaxial cable.

The operation of the test arrangement 20 in FIG. 3 will now be described with reference to FIGS. 4a-c, which schematically illustrate the test arrangement 20 at different stages of the test of the measurement unit 5 of the level gauge system 1.

Figures 4A, 4B, 4C:
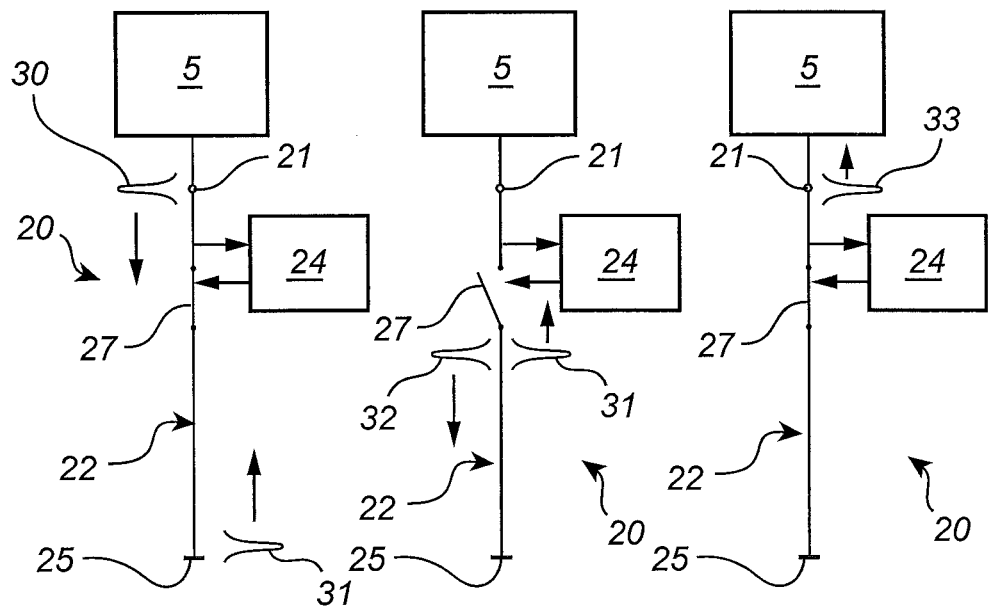
FIGS. 4a-c schematically illustrate operation of the test arrangement in FIG. 3.

Referring first to FIG. 4a, the timing control circuitry 24 has sensed an electromagnetic transmit signal 30 from the measurement unit 5 and has closed the switch 27 to allow the electromagnetic transmit signal to pass the switch 27 to travel along the waveguide 22 towards the second signal reflecting device 25 at the end of the waveguide 22, where the signal is reflected, as is illustrated by the pulse 31 on the right hand side of the waveguide 22 in FIG. 4a.

After the electromagnetic transmit signal 30 has passed the switch 27, but before the reflected signal 31 has traveled from the end 25 of the waveguide 22 to the switch 27, the timing control circuitry controls the switch 27 to its open state so that the pulse 31 traveling from the end 25 of the waveguide 22 towards the switch 27 is reflected at the switch 27 back towards the end 25 of the waveguide 22 as is illustrated by the pulse 32 on the left hand side of the waveguide 22 in FIG. 4b. With the switch 27 being in its open state, the signal is allowed to propagate back and forth along the waveguide 22 between the switch 27 and the end 25 of the waveguide 22. This continues until the signal has propagated the distance for which the measurement unit 5 should be tested. When this occurs, the timing control circuitry 24 again controls the switch 27 to its closed state so that the signal that has been reflected back and forth along the waveguide 22 is allowed to pass the switch 27 and return to the measurement unit 5. Based on a measurement by the measurement unit 5 and the known distance that the signal has been propagated along the waveguide 22, a test result can be determined.

Figure 5:
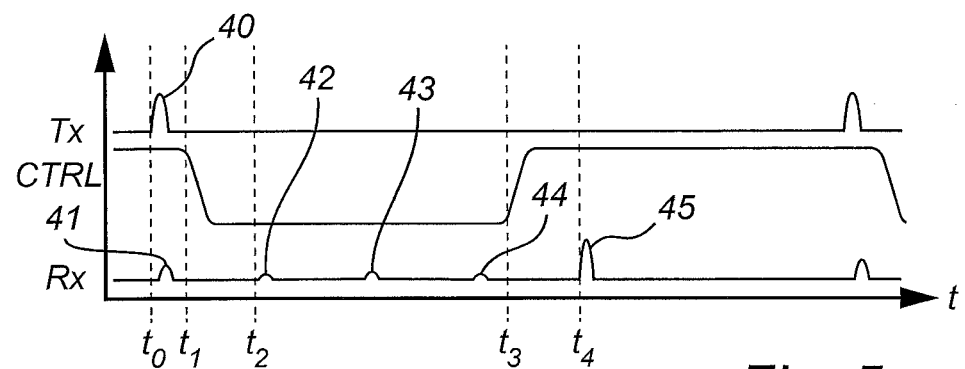
FIG. 5 is a diagram schematically illustrating an exemplary timing of electromagnetic signals when using the test arrangement in FIG. 3.

An exemplary timing of the signals involved in the test procedure described above will now be discussed with reference to FIG. 5. The signals shown in the schematic diagram of FIG. 5 are, from top to bottom, the electromagnetic transmit signal TX from the measurement unit 5, the control signal CTRL from the timing control circuitry 24 to the switch 27, and the electromagnetic reception signal RX received by the measurement unit 5.

At an initial time $t_0$, a first transmit pulse 40 is transmitted by the measurement unit 5. Shortly thereafter, a first return pulse 41 resulting from reflection of the first transmit pulse at the connection 21 is received by the measurement unit. After the first transmit pulse 40 has passed the switch 27, the timing control circuitry 24 goes from "high" to "low" at a time $t_1$ to control the switch from its closed state to its open state. Since the switch 27 exhibits some "signal leakage", small reflected signals 42, 43, 44 periodically pass through the switch 27 starting at time $t_2$ with the time between adjacent signal corresponding to the propagation time from the switch 27 to the end 25 of the waveguide 22 and back along the waveguide 22 to the switch 27.

Following a time $t_3$ corresponding to the desired number of signal passages back and forth between the open switch 27 and the end 25 of the probe 22, the switch 27 is again closed, to allow the next signal to pass the switch towards the measurement unit 5. This is illustrated in FIG. 5 by the larger pulse 45 arriving to the measurement unit at a time $t_4$ after control of the switch 27 to its closed state. Based on the time between transmission of the transmit pulse 40 and reception of the return pulse 45, the known signal propagation properties of the waveguide 22, and the known number of passages back and forth between the switch 27 and the end 25 of the waveguide 22, a test result for the measurement unit can be determined.

Figure 6:
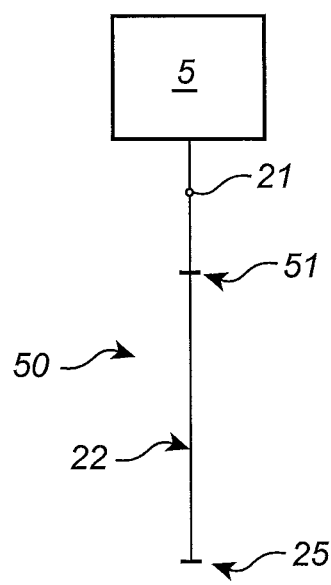
FIG. 6 is a schematic block diagram of a second embodiment of the test arrangement in FIG. 2.

A second embodiment of the test arrangement according to the present invention will now be described with reference to the block diagram in FIG. 6. Like the block diagram in FIG. 3, the block diagram in FIG. 6 shows the measurement unit 5 connected to the test arrangement 50. The test arrangement 50 in FIG. 6 differs from the test arrangement 20 in FIG. 3 in that the first signal reflecting device is provided in the form of a "strong" impedance transition 51 instead of a switch 27 that is actively controlled by timing circuitry. The impedance transition 51 may advantageously be configured to reflect at least 20 percent, such as 40-80 percent, of the power of an electromagnetic signal, particularly in the microwave frequency range, incident on the impedance transition 51. This will result in several reflections of the electromagnetic transmit signal being received by the measurement unit 5. The reflections will have decreasing power for an increasing number of reflections back and forth between the end 25 of the waveguide 22 and the impedance transition 51 along the waveguide 22. Analysis of the reflections may be facilitated by configuring the measurement unit 5 to only process received signals being in a given intensity range and/or timing range.

The reflection at the impedance transition 51 of the test arrangement in FIG. 6 should neither be "too weak" nor "too strong".

If the reflection is rather weak, a large proportion of the electromagnetic signal bouncing back and forth between the impedance transition 51 and the end 25 of the waveguide 22 will leave the space between the impedance transition 51 and the end 25 of the waveguide for each two-way passage. This means that the number of passages will be limited, since the signal strength of the signal that reaches the measurement unit 5 decreases rapidly with number of passages back and forth between the impedance transition 51 and the end 25 of the waveguide 22.

If, on the other hand, the reflection is very strong, signal reaching the measurement unit 5 may be considerably weaker than a typical surface echo.

Figure 7A:
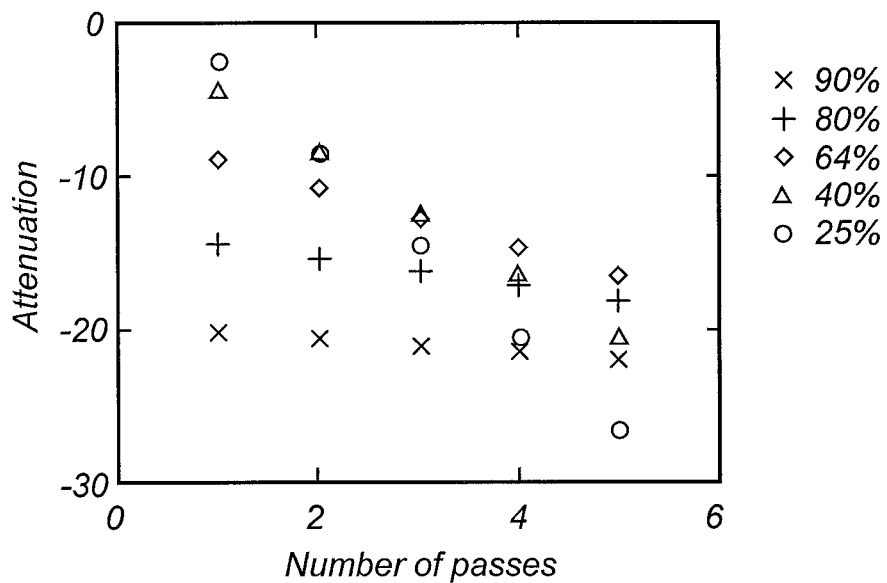
FIG. 7a is a diagram illustrating attenuation as a function of the reflection properties of the first reflecting device of the test arrangement in FIG. 6.

This is illustrated in FIG. 7a, which is a diagram in which the total attenuation (excluding cable loss) in dB is plotted as a function of the number of passages from the impedance transition 51 to the end 25 of the probe 22 and back for some different reflection properties of the impedance transition 51. The end 25 of the probe 22 is assumed to reflect 100 percent of the incident power.

The diagram shows that a test arrangement 50 with an impedance transition reflecting 25 percent of the incident power will be useable for distances corresponding to four two-way passes, but probably not for more since the signal attenuation increases rapidly.

As can also be seen in the diagram, an impedance transition reflecting 90 percent of the incident power will result in an attenuation of at least −20 dB for all signals reaching the measurement unit 5. For some applications, this attenuation may be too high.

From the simulation on which the diagram in FIG. 7a is based, it appears that an optimum power reflection range of the impedance transition 51 is around 40 percent to 80 percent.

An exemplary timing of the signals involved when using the test arrangement in FIG. 6 will now be discussed with reference to the diagram in FIG. 7b. In this example, reference is made to a pulsed radar level gauge system. It should, however, be noted that the test arrangement 50 in FIG. 6 is equally suitable for a radar level gauge system of the FMCW-type.

Figure 7B:
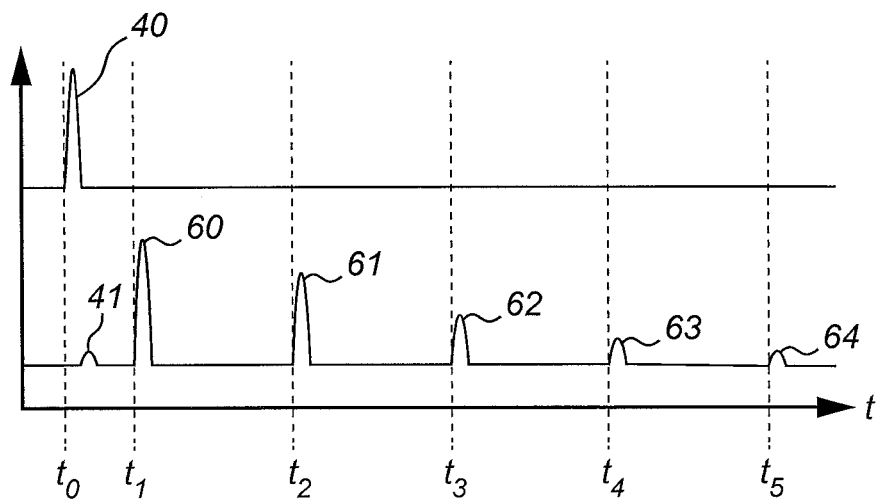
FIG. 7b is a diagram schematically illustrating an exemplary timing of electromagnetic signals when using the test arrangement in FIG. 6.

The signals shown in the schematic diagram of FIG. 7b are, from top to bottom, the electromagnetic transmit signal TX from the measurement unit 5 and the electromagnetic reception signal RX received by the measurement unit 5.

At an initial time $t_0$, a transmit signal 40 is transmitted by the measurement unit 5. Shortly thereafter, a first return pulse 41 resulting from reflection of the first transmit pulse at the connection 21 is received by the measurement unit 5. At a first time $t_1$, a first reflected signal 60 having a relatively high amplitude is received by the measurement unit. This reflected signal 60 corresponds to a first reflection at the impedance transition. A portion of the transmit signal 40 passes the impedance transition 51, is reflected by the end 25 of the waveguide 22 and again passes the impedance transition 51 towards the measurement unit 5, where it is received as a second reflected signal 61 at a second time $t_2$. Following additional passages back and forth along the waveguide 22, further reflected signals 62-64 are received by the measurement unit 5 at later times $t_3$-$t_5$.

Based on the timing of the received reflected signals, the known distances that the signals have traveled along the waveguide 22, and the known signal propagation properties of the waveguide 22, a test result for the measurement unit 5 can be determined.

The signals are not drawn to scale and are only intended to illustrate the gradually decreasing amplitude of signals following a larger number of passages through the waveguide and past the impedance transition 51.

An embodiment of the method according to the present invention will now be described with reference to the flowchart in FIG. 8.

Figure 8:
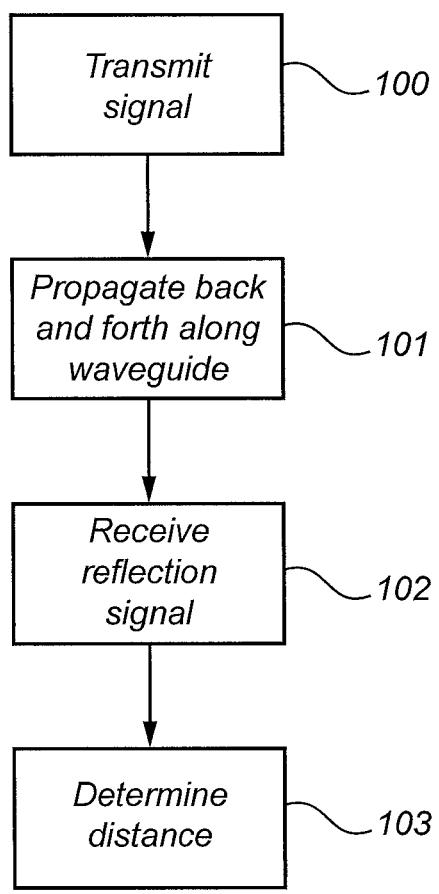
FIG. 8 is a flow chart outlining a method according to an embodiment of the invention.

Referring to FIG. 8, an electromagnetic transmit signal is transmitted from the measurement unit 5 in a first step 100.

In a subsequent step 101, the electromagnetic transmit signal is propagated past the first signal reflecting device of the test arrangement and then back and forth along the waveguide between the first signal reflecting device and the second signal reflecting device.

Thereafter, in step 102, an electromagnetic reflection signal resulting from the electromagnetic transmit signal having traveled back and forth between the first signal reflecting device and the second signal reflecting device a preselected number of times is received at the measurement unit.

Finally, in step 103, a distance corresponding to a time between transmission of the electromagnetic transmit signal and reception of the electromagnetic reflection signal is determined, from which a test result can be obtained.

The person skilled in the art realizes that the present invention by no means is limited to the preferred embodiments described above. On the contrary, many modifications and variations are possible within the scope of the appended claims.

What is claimed is:

1. A test arrangement for a level gauge system comprising a measurement unit and a signal propagation device connected to the measurement unit, the test arrangement comprising:
   a waveguide being connectable to the level gauge system at a connection to allow an electromagnetic transmit signal transmitted by the measurement unit to be propagated by said waveguide;
   a first signal reflecting device arranged along said waveguide, at a first distance along said waveguide from said connection, said first signal reflecting device being configured to allow at least a portion of said electromagnetic transmit signal from the measurement unit to pass said first signal reflecting device and continue further along said waveguide; and
   a second signal reflecting device arranged along said waveguide, at a second distance along said waveguide from said connection being greater than said first distance, for reflecting an electromagnetic signal traveling along said waveguide from said first signal reflecting device back towards said first signal reflecting device,
   wherein said first signal reflecting device is configured to reflect an electromagnetic signal traveling along said waveguide from said second signal reflecting device back towards said second reflecting device and to allow, at least during a time period occurring at a predetermined time after transmission of said electromagnetic transmit signal from said measurement unit, an electromagnetic signal traveling along said waveguide from said second signal reflecting device towards said first signal reflecting device to pass said first signal reflecting device to allow said electromagnetic signal to be received by said measurement unit of the level gauge system.

2. The test arrangement according to claim 1, wherein said first signal reflecting device comprises an impedance transition.

3. The test arrangement according to claim 2, wherein said impedance transition is configured to reflect a first portion of a power of an electromagnetic signal incident on said impedance transition and to allow passage of a second portion of said power of said electromagnetic signal.

4. The test arrangement according to claim 3, wherein said first portion is at least 20 percent of said power of the electromagnetic signal incident on said impedance transition.

5. The test arrangement according to claim 1, wherein said first signal reflecting device comprises switching circuitry controllable between a signal conducting state and a signal reflecting state.

6. The test arrangement according to claim 5, wherein said test arrangement further comprises timing control circuitry connected to said switching circuitry and to said waveguide between said connection and said switching circuitry,
   said timing control circuitry being configured to sense said electromagnetic transmit signal transmitted by the measurement unit and to control a switching state of said switching circuitry based on a timing of said electromagnetic transmit signal.

7. The test arrangement according to claim 5, wherein said switching circuitry is configured to have a switching time from said signal conducting state to said signal reflecting state being substantially longer than one nanosecond.

8. The test arrangement according to claim 5, wherein said switching circuitry is configured to have a switching time from said signal conducting state to said signal reflecting state being shorter than a propagation time of an electromagnetic signal along said waveguide from said switching circuitry to said second signal reflecting device and back to said switching circuitry.

9. The test arrangement according to claim 1, wherein said second signal reflecting device is arranged at an end of said waveguide.

10. The test arrangement according to claim 1, wherein said waveguide is a coaxial cable.

11. A level gauge system for determining a filling level of a product contained in a tank, comprising:
    a measurement unit;
    a signal propagation device connected to said measurement unit for propagating an electromagnetic transmit signal from said measurement unit towards a surface of said product, and to return an electromagnetic reflection signal resulting from reflection of said electromagnetic transmit signal at said surface back to said measurement unit; and
    a test arrangement according to claim 1,
    wherein said level gauge system is controllable between:
    a filling level determination state in which said measurement unit determines said filling level based on said electromagnetic reflection signal; and
    a test state in which said waveguide of said test arrangement is connected to said measurement unit in such a way that said electromagnetic transmit signal transmitted by said measurement unit is propagated by said waveguide.

12. The level gauge system according to claim 11, wherein said level gauge system, in said test state, is configured to determine a test result based on an electromagnetic signal received from said test arrangement only during a time period corresponding to the particular distance for which said level gauge system should be tested.

13. A method of testing a level gauge system comprising a measurement unit and a signal propagation device connected to the measurement unit, using a test arrangement comprising a waveguide, a first signal reflecting device arranged along said waveguide and a second signal reflecting device arranged along said waveguide spaced apart from said first signal reflection device, said method comprising the steps of:
    transmitting an electromagnetic transmit signal from said measurement unit;
    propagating said electromagnetic transmit signal along said waveguide from a connection at which said waveguide is connected to said measurement unit past said first signal reflecting device to said second signal reflecting device, where said electromagnetic transmit signal is reflected back along said waveguide towards said first signal reflecting device and then back and forth between said first reflecting device and said second reflecting device;
    receiving, at said measurement unit, an electromagnetic reflection signal resulting from said electromagnetic transmit signal having traveled back and forth between said first signal reflecting device and said second signal reflecting device a preselected number of times; and
    determining a distance corresponding to a time between transmission of said electromagnetic transmit signal and reception of said electromagnetic reflection signal.

14. The method according to claim 13, further comprising the steps of:

detaching said measurement unit from said signal propagation device; and connecting said waveguide of said test arrangement to said measurement unit.

15. The method according to claim 13, wherein said method further comprises the steps of:

controlling switching circuitry comprised in said first reflecting device from a signal conducting state to a signal reflecting state after said electromagnetic transmit signal transmitted by said measurement unit has passed said switching circuitry; and controlling said switching circuitry from said signal reflecting state to said signal conducting state after said electromagnetic transmit signal has traveled back and forth between said first signal reflecting device and said second signal reflecting device said preselected number of times.

* * * * *